United States Patent
Stuckman et al.

(10) Patent No.: US 12,221,672 B2
(45) Date of Patent: Feb. 11, 2025

(54) STEP-LEACHING PROCESS OF RARE EARTH ELEMENTS FROM ASH MATERIALS USING MILD INORGANIC ACIDS AT AMBIENT CONDITIONS

(71) Applicant: United States Department of Energy, Washington, DC (US)

(72) Inventors: Mengling Stuckman, Bethel Park, PA (US); Christina L. Lopano, Bethel Park, PA (US); Thomas Tarka, Pittsburgh, PA (US)

(73) Assignee: United States Department of Energy, Washington, DC (US)

( * ) Notice: Subject to any disclaimer, the term of this patent is extended or adjusted under 35 U.S.C. 154(b) by 881 days.

(21) Appl. No.: 17/376,715

(22) Filed: Jul. 15, 2021

(65) Prior Publication Data

US 2022/0017992 A1    Jan. 20, 2022

Related U.S. Application Data

(60) Provisional application No. 63/053,925, filed on Jul. 20, 2020.

(51) Int. Cl.
*C22B 59/00* (2006.01)
*C22B 7/00* (2006.01)

(52) U.S. Cl.
CPC .............. *C22B 59/00* (2013.01); *C22B 7/007* (2013.01)

(58) Field of Classification Search
None
See application file for complete search history.

(56) References Cited

U.S. PATENT DOCUMENTS 8,968,688 B2    3/2015  Joshi et al.
9,783,870 B2    10/2017 Vaisanen et al.
(Continued)

FOREIGN PATENT DOCUMENTS

CN    106011476 A  * 10/2016 ............. C22B 59/00

OTHER PUBLICATIONS

Polyák, K. and Hlavay, J. Chemical fractionation of a fly ash sample by a sequential leaching method. Fresenium J. Anal. Chem (2001) 371:838-842. (Year: 2001).*

(Continued)

*Primary Examiner* — Daniel Berns
*Assistant Examiner* — Zachary John Baum
(74) *Attorney, Agent, or Firm* — Aaron R. Keith; Andrew Y. Choi; Michael J. Dobbs (57) ABSTRACT

The invention provides a method for extracting REEs from ash having the steps of contacting ash with a first acid solution to generate leachate having a pH between approximately 5.0 and approximately 5.5; contacting the ash with a second acid solution to generate leachate having a pH between approximately 2.8 and approximately 3.5; and contacting the ash with a third acid solution to generate leachate having a pH between approximately -0.6 and approximately 0.5. The invention also provides a method for leaching REEs from ash having the steps of: contacting ash with a first amount of acid sufficient to leach Ca and AJ from the ash without leaching REEs; contacting the ash with a second amount of acid sufficient to leach REEs from the ash without leaching Fe and Sc; and contacting ash with a third amount of acid sufficient to leach Fe and Sc from the ash.

14 Claims, 7 Drawing Sheets

(56) References Cited

U.S. PATENT DOCUMENTS 10,626,482 B2     4/2020    Peterson et al.
2017/0356067 A1*   12/2017   Peterson ................ C01B 39/46

OTHER PUBLICATIONS

English translation of CN 106011476 A. (Year: 2016).*
Wen, Y. Rare earth elements recovery and waste management of municipal solid waste incineration ash. ACS Sustainable Resour. Manage. 2024, 1, 17-27. (Year: 2024).*
Liu, F., et al. Leaching Characteristics of Heavy Metals in Municipal Solid Waste Incinerator Fly Ash, Journal of Environmental Science and Health (2005) 40:10, 1975-1985, DOI: 10.1080/10934520500184707. (Year: 2005).*
Kumari, A., et al. Novel approach to recover rare earth metals (REMs) from Indian coal bottom ash. Hydrometallurgy 187 (2019) 1-7. (Year: 2019).*
Jiao, F., et al. Study on the species of heavy metals in MSW incineration fly ash and their leaching behavior. Fuel Processing Technology 152 (2016) 108-115. (Year: 2016).*
Hedrick, James B. "Rare-earth metals." USGS, Minerals Yearbook 1996 (1997). (Year: 1997).*
American Coal Ash Association, Coal Combustion Product Production & Use Survey Report, 2019.
Taggart et al., Trends in the Rare Earth Element Content of U.S.-Based Coal Combustion Fly Ashes, Environmental Science & Technology, 2016.
Stuckman et al., Distribution and Speciation of Rare Earth Elements in Coal Combustion By-products via Synchrotron Microscopy and Spectroscopy, International Journal of Coal Geology, 2018.
Kolker et al., Distribution of Rare Earth Elements in Coal Combustion Fly Ash, Determined by SHRIMP-RG Ion Microprobe, International Journal of Coal Geology, 2017.
Xie, F., et al., A critical review on solvent extraction of rare earths from aqueous solutions, Mineral Engineering, 2014.
Stuckman et al., Characterization and Recover of Rare Earth Elements from Power River basin Coal Ash, International Pittsburgh Coal Conference, 2019.
King et al., Aqueous acid and alkaline extraction of rare earth elements from coal combustion ash, International Journal of Coal Geology, vol. 195, 2018, pp. 75-83.
Lin et al., Application of sequential extraction and hydrothermal treatment for characterization and enrichment of rare earth elements from coal fly ash, Fuel, vol. 232, 2018, pp. 124-133.
Josso et al., Extraction and separation of rare earth elements from hydrothermal metalliferous sediments, Minerals Engineering, vol. 118, 2018, pp. 106-121.

* cited by examiner

STEP-LEACHING PROCESS OF RARE EARTH ELEMENTS FROM ASH MATERIALS USING MILD INORGANIC ACIDS AT AMBIENT CONDITIONS

PRIORITY CLAIM

This Utility patent application claims priority benefit as a U.S. Non-Provisional of U.S. Provisional Patent Application Ser. No. 63/053,925, filed on Jul. 20, 2020, currently pending, the entirety of which is incorporated by reference herein.

STATEMENT OF GOVERNMENT SUPPORT

The United States Government has rights in this invention pursuant to an employer/employee relationship between the inventors and the U.S. Department of Energy, operators of the National Energy Technology Laboratory (NETL).

FIELD OF THE INVENTION

Embodiments relate to a method for recovery of rare earth elements from ash materials, specifically ash materials containing calcium phases.

BACKGROUND

Rare earth elements (REEs) are necessary for the advancement of technological and energy applications. Examples of REEs include lanthanum (La), cerium (Ce), praseodymium (Pr), neodymium (Nd), promethium (Pm), Samarium (Sm), europium (Eu), gadolinium (Gd), terbium (Tb), dysprosium (Dy), holmium (Ho), erbium (Er), thulium (Tm), ytterbium (Yb), lutetium (Lu), scandium (Sc) and yttrium (Y). China currently controls the world's supply and the process of REEs. With limited economically viable domestic REE resources, supply remains a major concern for the United States. Efforts to secure a domestic source of REEs require the development of efficient, cost-effective, and environmentally friendly methods for REE extraction from naturally occurring materials (e.g., mined from geological formations), recycled products (e.g., end-of-life electronics containing REEs), and/or waste streams (e.g., coal-related by-products).

Current methods and technologies for REE extraction either use hot (commonly between 90° C. and 400° C.) inorganic acids to extract REEs from ore and other sources or use relatively strong, sometimes heated, bases and salts. Physical processing, such as mining, crushing, fine grinding, particle size separation, and magnetic separation, are commonly used to concentrate the REE-bearing minerals before acids or bases are applied. Large concentrations of undesirable elements, such as aluminum (Al), calcium (Ca), iron (Fe), and silicon (Si), are often extracted along with the REEs and complicate the refinement of the extracted REEs into saleable product. Furthermore, radioactive thorium (Th) is commonly found in naturally occurring rare earth minerals and is often extracted inadvertently, which can lead to costly handling and disposal problems. The extensive and complicated processing described above contributes to the high unit costs for REEs.

The current technology for REE extraction in the United States has the following limitations. Known REE extraction methods use strong acids or bases. Strong acids and bases create hazards to workers and the environment and increase capital costs. Current REE extraction technology also requires heating the ore to high temperatures (typically 90° C. to 400° C.). Heating the ore requires additional costs for heating fuel, creates worker hazards, impacts the environment, and increases capital costs. The current technology also has low extractability of scandium (Sc) and high-cost for Sc recovery. Additionally, the current REE extraction methods co-extract large concentrations of total dissolved solids (TDS) in pregnant leaching solution (PLS), which results in more cycles or more reagents of next-step liquid to liquid (L:L) extraction to purify REEs from PLS. The current methods also co-extract large concentrations of unwanted elements (including radioactive thorium) that must be separated from the desired REEs, which has associated multi-step processing costs (e.g., for infrastructure, energy), worker hazards, and waste handling.

Furthermore, the United States faces particular difficulties in REE extraction and production. First, the United States is unable to compete in the open market with Chinese producers, which have low REE prices and are able to manipulate the world's REE market through its REE export policies and restrictions. Additionally, the United States has a societal aversion to additional mining and to mineral processing technologies that are viewed as hazardous to workers and the environment. The United States also has additional permitting costs and environment, safety, and heath compliance costs. Lastly, materials common in the United States that could have beneficial use are currently viewed as wastes, such as ash produced at power generators, or as lost opportunities, such as shale layers and underclays that could be co-mined with the coal but are currently avoided.

One potential domestic source of REE that has received significant attention is ash material, exemplary ash material including that produced from coal combustion during power generation. The United States generates more than one-third of its electricity from coal combustion. As a result, approximately 113 metric tons of coal combustion products are generated annually, among which 38 million tons are fly ashes and 9 million tons are bottom ashes. With median REE concentrations reported in United States ash at 481 milligrams per kilogram, it is estimated that a total of 8,910 tons of rare earth oxides (REOs) can be generated from all unused fly ash reserve annually in the United States. The annual REO production from fly ash alone could satisfy 94 percent of domestic annual demand, which was reported as 9,500 tons in 2018. Ash has several beneficial properties as feedstock. First, it is a readily available waste material with strong environmental incentives and an established market for beneficial reuse. Second, fly ash specifically does not require extensive excavation and has been pre-concentrated and pulverized at the power plant through the process of combustion. This significantly reduces the cost of REE mining as well as chemical and physical processing compared to traditional ore processing steps. Ash has the potential to provide an additional revenue stream to electric power generators, effectively diversifying their product slate. Furthermore, re-mining ash could provide a significant domestic resource as substantial amounts of ash have been land-filled around the nation, some of which is currently being relocated due to new environmental regulations.

Despite its promising potential as a feedstock, attempts to extract and concentrate REE from ash have proven to be challenging. Notably, REE can become encapsulated in a difficult-to-dissolve glassy matrix during combustion, which limits extraction levels via conventional acid extraction processes. Researchers have discovered pre-treatment steps which can dramatically increase extraction efficiencies. However, this extra step adds cost and complexity to the extraction process.

A need exists in the art for an effective method of extracting REEs from ash materials. Specifically, there is need for an economically viable and environmentally benign method to extract REEs from ash material.

SUMMARY

One object of at least one embodiment relates to a method for extracting REEs from ash. The method comprises using mild acids to dissolve different portions of the ash in stages, which limits the impurities that are co-leached with the REEs. By targeting only select phases of the ash, chemical consumption, hazardous waste and unwanted by-products are dramatically reduced.

Another object of the invention relates to minimizing the amount and concentration of acids used to leach REEs and Sc from ash material. A feature of the invention is the use of mild acids in smaller amounts and low concentrations compared to prior art methods. An advantage of the invention is using 18-30 mmol/g (mmol acid/gram of ash) amount of acid compared to prior art methods using up to 1500 mmol/g.

Yet another object of the invention is leaching REEs and Sc from ash material using ambient conditions. A feature of the invention is that the invented method for extracting REEs and Sc from ash material is suitable for use in ambient conditions (i.e. ambient temperature and pressure). An advantage of the invention is that the invented method does not require raised temperatures or pressures or related equipment to extract REEs and Sc from ash material.

Still another object of the invention is to provide a scalable ash material leaching method to recover REEs. An advantage of the invention is that it requires no pre-processing of ash materials prior to use of those materials with the instant invention. A feature of the invention is a highly scalable method requiring ambient conditions (temperature and pressure), low acid amounts compared to prior art methods, and no pre-treatment of ash materials.

Another object of one or more embodiments of the invention relates to a pH titration pretest method that is used to determine that amount of acid to add at each stage of the invented three-step method. For the pH titration pretest, samples of coal ash are tested to record different acid amounts required to reach certain end pH levels in the final leachate. A titration curve is generated to show the pH response as a function of acid added. This titration curve is used to determine the amount of acid necessary to reach the desired end pH for each stage of the disclosed three-step REE extraction method.

Another object of one or more embodiments of the invention is to provide a protocol to for determining the amount of acid needed in the invented leaching method that is based on empirical data collected from multiple ash samples. A pH titration curve can be established with acid addition from 0.0 to 12 mmol/g to look for acid addition required for the first leaching step of the invented leaching protocol. Using empirical data, the amounts of acid added in the second leaching step and in the third leaching step can be roughly determined.

The invention provides a method for leaching REEs from ash material comprising: contacting an ash material containing REEs with a first acid solution to generate a first leachate having a pH between approximately 5.0 and approximately 5.5; contacting the ash material with a second acid solution to generate a second leachate having a second pH between approximately 2.8 and approximately 3.5; and contacting the ash material with a third acid solution to generate a third leachate having a third pH between approximately −0.6 and approximately 0.5.

The invention also provides a method for leaching REE-containing ash material comprising: contacting an REE-containing ash material with a first amount of acid, wherein the first amount of acid is sufficient to leach Ca and Al from the ash material without leaching REE phases from the ash material; contacting ash material with a second amount of acid, wherein the second amount of acid is sufficient to leach REE phases from the ash material without leaching Fe and Sc phases from the ash material; and contacting ash material with a third amount of acid, wherein the third amount of acid is sufficient to leach Fe and Sc phases from the ash material.

BRIEF DESCRIPTION OF THE DRAWINGS

The invention together with the above and other objects and advantages will be best understood from the following detailed description of the preferred embodiment of the invention shown in the accompanying drawings, wherein.

DETAILED DESCRIPTION

The following detailed description should be read with reference to the drawings in which similar elements in different drawings are numbered the same. The drawings, which are not necessarily to scale, depict illustrative embodiments and are not intended to limit the scope of the invention.

The invention described herein adds acid solutions to ash material. As used herein, terms describing the quantity or amount of an acid refer to the H+ normality of said acid. For example, terms such as "amount of acid," "mmol of acid," "acid amounts," and "required acid" refer to the amount of protons or H+ ions expected in solution given ideal dissolution of said acid. As such, and as an example, adding 100 mL of 1 M HCl to 1.0 gram of ash is the same "amount of acid added/per gram of ash material" as used herein as adding 50 mL of 1 M $H_2SO_4$ to 1.0 gram of ash.

Units of concentration such as mol/L or M are used according to their plain and ordinary meaning.

Generally, the inventors have discovered a method for extracting rare earth elements (REE) from ash material. As used in this disclosure, REE or REEs include lanthanum (La), cerium (Ce), praseodymium (Pr), neodymium (Nd), promethium (Pm), Samarium (Sm), europium (Eu), gadolinium (Gd), terbium (Tb), dysprosium (Dy), holmium (Ho), erbium (Er), thulium (Tm), ytterbium (Yb), lutetium (Lu), scandium (Sc) and yttrium (Y), and combinations thereof. An embodiment of the method comprises contacting the ash material with a sufficient amount of a first acid for sufficient time to generate a first leachate having a pH between approximately 5.5 and approximately 5.0; contacting the ash material with a sufficient amount of a second acid for a sufficient time to generate a second leachate having a pH between approximately 3.5 and approximately 2.8; and contacting the ash material with a sufficient amount of a third acid for a sufficient amount of time to generate a third leachate 42 having a pH between approximately 0.5 and approximately −0.6.

In an embodiment, the instant invention uses mild acids with the smallest possible quantities under ambient temperature and pressure. This method is particularly effective for Powder River Basin (PRB) coal ash samples with amorphous Ca-enriched aluminosilicate phases, susceptible for direct acid dissolution. PRB coal is the single biggest coal producing basin in the U.S. and constitutes over 40% of domestic coal production. Currently there were 126 coal fired power plants which exclusively burn PRB coal. 41 million tons of ash were disposed of in onsite landfills or ponds, as well as in offsite repositories. 8 million tons were stored either on site or offsite. Accordingly, 2300 tonnes of REE could be extracted per year from unused ash if this invention can be widely deployed, generating an estimated total value of $1.4 billion in. The total value will be able to supplant 11% to 16% of raw REE imports for U.S.

In an embodiment, the acid usage of the invention is only 10% compared to prior art using similar feedstock, with total cost for acid use of $0.06-0.17/kg ash compared to $0.27-6.201 kg ash in cited patent. This method is more cost effective compared to other inventions or references, as no pre-treatment, no heating or pressure control devices are required for scaling up for REE extraction. This process also significantly reduces the cost of acid consumption during REE leaching, the solvent extraction consumption for further REE and Sc purification, and the cost of waste disposal during these processes.

In an embodiment, the invention comprises a method for leaching REE-containing ash material comprising contacting ash material with sufficient acid to leach Ca and Al from the ash material without leaching REE phases from the ash material; contacting ash material with sufficient acid to leach REE phases from the ash material without leaching Fe and Sc phases from the ash material; and contacting ash material with sufficient acid to leach Fe and Sc phases from the ash material.

Leaching Protocol Detail

Figure 1:
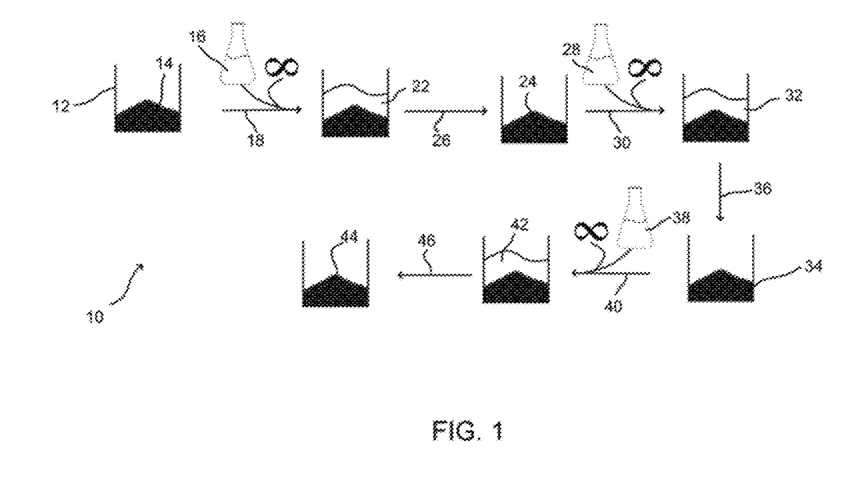
FIG. 1 is a schematic showing a leaching process to recover REEs, Fe, and Sc from ash material, in accordance with the features of the present invention.

FIG. 1 is a schematic of an exemplary embodiment of the invented REE leaching protocol 10. Looking to FIG. 1, the protocol 10 begins with charging the leaching vessel 12 with REE-containing ash material 14. A first acid solution 16 is then added to the leaching vessel 12, the resulting mixture agitated for a predetermined amount of time 18 or until the first leachate 22, the liquid phase of ash 14 and first acid solution 16 mixture, reaches a first predetermined pH. The first leachate 22 generated from the first leaching step 18 is removed from remaining ash material 24 via filtration, centrifugation, and combinations thereof 26 for disposal or further processing. For example, the Ca-rich first leachate 22 can be dehydrated and processed for industrial use or agricultural use.

In an embodiment, the first leaching 18 is repeated one or more times, combining all the leachates generated therefrom with the first leachate 22.

The instant invention is suitable for use with any REE-containing ash material 14. Suitable REE-containing ash materials include combustion products of coal. Exemplary REE-containing ash materials from coal combustion include fly ash, bottom ash, ponded ash, landfill ash, and combinations thereof. Preferable ash material for use in this invention comprises at least 15 wt % Ca.

A salient feature of the invention is the suitability of variously sourced ashes for REE leaching. For example, ash produced in a coal power plant can be leached immediately after said ash is produced. Alternatively, ash that has been disposed by burial in a landfill or otherwise can be retrieved to be leached using the instant invention.

In alternative embodiments, the REE-containing materials are non-coal combustion materials.

The first acid solution 16 used in the first leaching 18 can be an aqueous solution of any monovalent mineral acid. Suitable monovalent mineral acids include HCl, $HNO_3$, and combinations thereof.

The first leaching step 18 can use the first acid used to make the first acid solution 16 in any amount and concentration suitable to generate a first leachate 22 that has a desired pH between approximately 5.0 and approximately 5.5. In an embodiment, the first acid solution 16 has a concentration between approximately 0.1 M and 1.0 M and is used in a volume to give and about 10:1 mL/g (mL of acid solution per gram of ash material).

The first leaching step 18 dissolves Ca phases from the ash material 14 without the release of REEs or scandium (Sc). In an embodiment, the first leaching step 18 dissolves between approximately 20 percent and approximately 60 percent of total calcium (Ca) and magnesium (Mg) initially present in the ash material moves into the first leachate 22, with approximately 50 percent of the total sodium (Na) and potassium (K) in the initial ash also dissolving into the first leachate 22.

A salient feature of the invention is that the first leaching 18 reduces the amount of total dissolved solids in leachates produced in subsequent leaching steps. Said reduction of dissolved solids reduces in subsequent leachates reduces required acid to produce said subsequent leachates and reduces required purification and processing steps needed to extract desired moieties from said subsequent leachates.

Another salient feature of the invention is that it is environmentally friendly. For example, the first leachate 22 is designed to have a pH between approximately 5.5 and approximately 5.0, and typically not less than 5.0. In this range, no special precautions are needed to dispose of the leachate 22.

Returning to FIG. 1, ash material 24 remaining from the first leaching 18 is contacted with a second acid solution 28, the resulting mixture agitated for a predetermined amount of time 30 or until the second leachate 32, the liquid phase of the ash 24 and second acid solution 28 mixture, reaches a second predetermined pH. The second leachate 32 generated from the second leaching 30 in the protocol 10 is removed from remaining ash material 34 via filtration, centrifugation, and combinations thereof 36 for further processing.

In an embodiment, the second leaching step 30 is repeated one or more times, combining all the leachates generated therefrom with the second leachate 32.

The second acid solution 28 used in the second leaching step 30 can be an aqueous solution of any monovalent or divalent mineral acid. Suitable acids include HCl, $HNO_3$, $H_2SO_4$, and combinations thereof. The second acid solution 28 can include or not include the acid or acids used to make the first acid solution 16.

The second leaching step 30 can use the acid used to make the second acid solution 28 in any amount and concentration suitable to generate a second leachate 32 that has a desired pH (second predetermined pH) between approximately 3.5 and approximately 2.8. In an embodiment, the second acid solution 28 has a concentration between approximately 0.5 M and 1.9 M and is used in a volume to give a Liquid:Solid of about 10 mL of acid solution:1 gram of ash material. A salient feature of the invention is the use of as little acid as possible to leach the ash material. In an embodiment, the first 18 and second 30 leaching steps use a combined 18-20 mmol of acid per gram of starting ash material.

In an embodiment, the second leaching step 30 dissolves mainly aluminum (Al) phases and REEs from the ash material 24 without significant release of iron (Fe). The inventors have discovered and empirically measured that the second leaching step 30 extracts between approximately 80 to 100 approximately percent of REEs and up to 60 percent of Al originally contained in the ash material 14. Preferably, the instant protocol 10 extracts at least approximately 80 percent of REEs contained in the original ash material, more preferably at least approximately 100 percent, and typically approximately 90 percent. The second leaching step 30 extracts the REEs into the second leachate 32 while selectively suppressing Fe dissolution (intentionally retaining Fe moieties as solids within the ash material) and reducing total dissolved solids in the second leachate 32. REEs are extracted from the second leachate 32 using extraction protocols known in the art. Al and Al oxides can be separated from the second leachate 32 after REEs are extracted from said second leachate 32.

The second leaching step 30 generates a second leachate 32 having a second predetermined pH between approximately 3.5 and approximately 2.8, preferably no less than 3.0, to limit the total dissolved solids (including Fe phases) in the second leachate 32. Removing Ca phases from the ash material in the first leaching step 18 and limiting total dissolved solids in the second leachate provides said second leachate 32 that is suitable for immediate use with liquid:liquid extraction without any pH adjustment or further filtering after the second leachate is separated from leftover ash material 34. Further, as the instant protocol produces a second leachate with minimal total dissolved solids and Fe, less extraction cycles and related solvents are needed to extract the REEs from the second leachate than in prior art protocols. For example, as the total dissolved solids are reduced in the second leachate of the instant protocol, the volume:volume of extractant to leachate can be as low as 1:30 compared to known prior art extraction protocols that use of 1:1 or 10:1 ratios.

A salient feature of the invention is that it does not dissolve radioactive elements such as Thorium (Th) and uranium (U) into the second leachate as the pH of the second leachate is maintained at a high enough level to prevent release of these radioactive elements from the ash material.

Returning to FIG. 1, ash material 34 remaining from the second leaching 30 is contacted with a third acid solution 38, the resulting mixture agitated for a predetermined amount of time 40 or until the third leachate 42, the liquid phase of the ash 34 and third acid solution 38 mixture, reaches a second predetermined pH. The third leachate 42 generated from the second leaching 30 in the protocol 10 is removed from remaining ash material 44 via filtration, centrifugation, and combinations thereof 46 for further processing.

In an embodiment, the third leaching step 40 is repeated one or more times, combining all the leachates generated therefrom with the third leachate 42.

The third acid solution 38 used in the third leaching step 40 can be an aqueous solution of any acid. Suitable acids include monoprotic acids, diprotic acids, multiprotic acids, organic acids, inorganic acids, and combinations thereof.

The third leaching step 40 can use the acid used to make the third acid solution 38 in any amount and concentration suitable to generate a third leachate 42 that has a desired pH (third predetermined pH) between approximately 0.5 to approximately −0.6. In an embodiment, the third acid solution 38 has a concentration between approximately 0.3 M and approximately 1.2 M and is used in a volume to give a Liquid:Solid of about 10 mL of acid solution:1 gram of ash material. A salient feature of the invention is the use of as little acid as possible to leach the ash material. In an embodiment, the third leaching step uses between 8 and 12 mmol of acid per gram of starting ash material.

In an embodiment, the third leaching step 40 extracts approximately 60 to approximately 80 percent of iron phases and between approximately 50 percent to approximately 80 percent of scandium phases present in the initial ash material 14 and into the third leachate 42.

A salient feature of the invention is that the invented leaching protocol 10 uses about ten percent of the acid consumption of prior art methods which results in superior levels of REEs in the second leachate 32 and significantly less total dissolved solids (TDS) in all three leachates of the protocol. Surprisingly and unexpectedly, the entire invented protocol is performed with mild pHs at ambient temperature and pressure, as opposed to prior art methods that use more acid, raised temperatures and pressures, and other harsh reagents and solvents.

Yet another salient feature of the invented ash leaching protocol 10 is that it does not require pre-treatment of ash material prior to subjecting the ash material to the invented protocol.

In an embodiment, the first, second, and third leaching steps are performed by adding their respective acid solutions to the ash material, wherein the resulting mixture is agitated for a predetermined amount of time between about 16 hours and about 24 hours.

In an alternative embodiment, the leaching steps are performed while observing the pH of the leachate, and moving on to the next step in the protocol once the desired pH is reached and maintained for an hour.

In yet another embodiment, various steps of the protocol 10 can be combined where a user does not need to utilize the selective dissolution of target portions of ash material in discrete leachings. For example, if a user does not wish leach Ca from ash material prior to leaching REEs, the first 18 and second 30 leachings can be combined into a single acid addition between approximately 18 to approximately 20 mmol of acid/gram of ash material to an end pH of approximately 3.0. Similarly, a user of the invented method can perform the second 30 and third 40 leaching steps together with a single acid addition to an end pH of approximately 0.0 in order to co-leach REE with Sc from ash material.

The inventors have discovered that the three step leaching protocol 10 addresses significant disadvantages of existing ash leaching methods. For example, REEs are contained in glassy phases of ash materials. Prior art methods require pre-treatment of their ash materials in order to release REEs from these glassy phases, using pre-treatments with strong bases, microwaves, grinding ash materials, and combinations thereof. The instant invention selectively dissolves target moieties in each of the three leaching steps and therefore does not require pre-treatment of ash materials. In an embodiment, the first leaching step targets and leaches Ca, Mg, and K from ash material, the second leaching step targets and leaches REEs and Al from the ash material, and the third leaching step targets and leaches Sc and Fe from ash the material. The targeted leaching increase the selectivity of the method and allow for reduced usage of extractants and processing necessary as a user of the instant method need only process desired moieties from the relevant leachate. In an embodiment, the ash material comprises amorphous Ca-enriched aluminosilicate phases that are susceptible to direct acid dissolution, exemplary ash material including Powder River Basin Coal ash and ash materials collected from boiler with Ca-rich additives (such as lime).

pH Titration Protocol Detail

In an embodiment, a pH titration pretest is performed using samples of the ash material to be used in the leaching protocol 10 shown in FIG. 1 prior to performance of the protocol 10. The results of the pH titration test can be used to predetermine the amount of acid to be used in each of the three leaching steps of the protocol 10.

Figure 2:
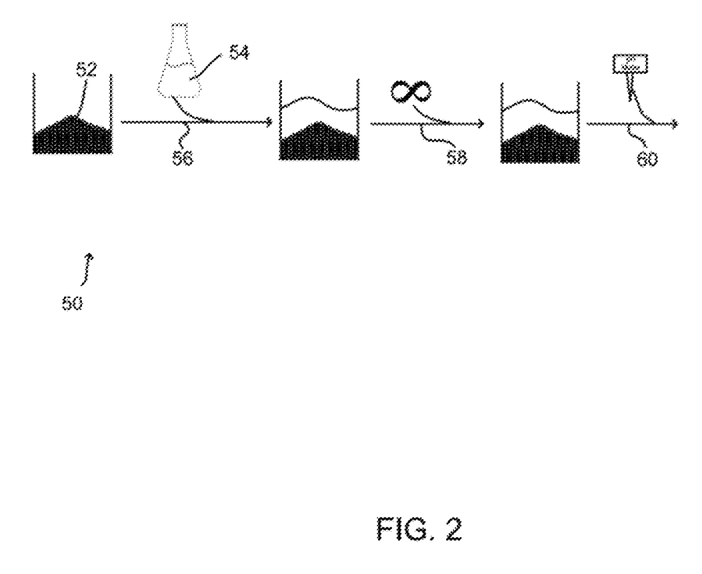
FIG. 2 is a schematic showing a process for generating a pH titration curve for an ash sample, in accordance with the features of the present invention.
Figure 3:
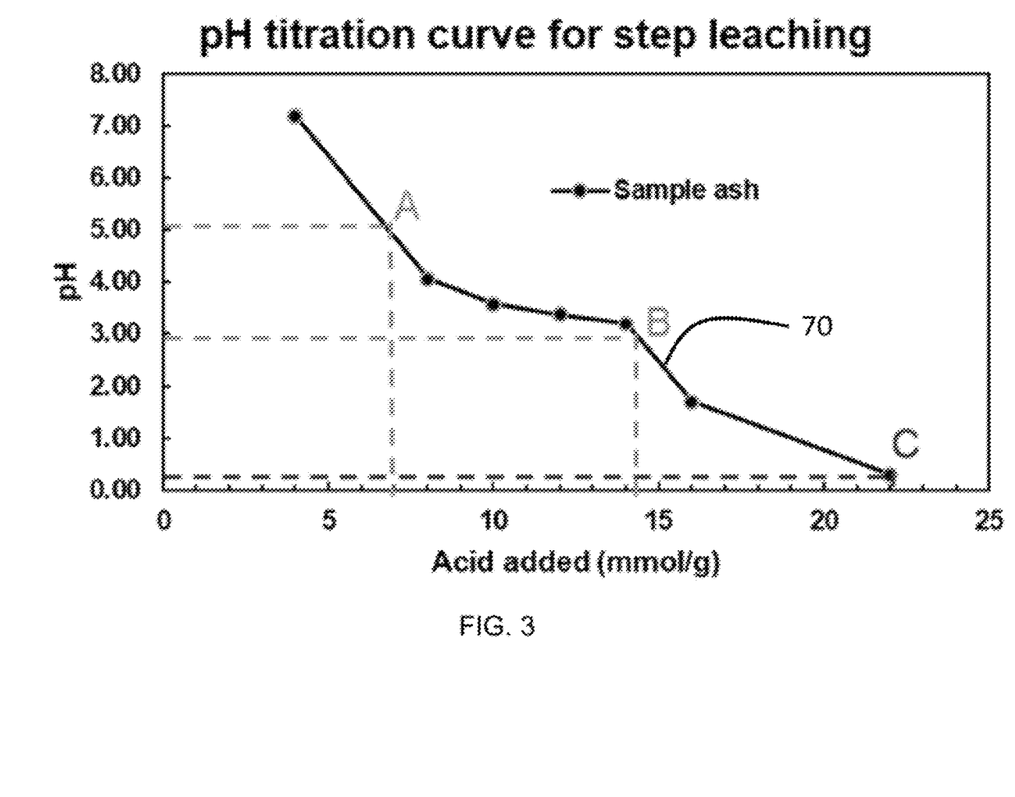
FIG. 3 is an exemplary titration curve, in accordance with the features of the present invention.

A schematic for a pH titration test 50 suitable to precede the leaching protocol 10 of FIG. 1 is shown in FIG. 2. To begin the pH titration 50, a dried and weighed sample of ash material 52 is combined 56 with an aliquot of acid solution 54. The aliquot of acid solution 54 comprises a mixture of a predetermined amount of acid and deionized water such that the combined ash material 52 and aliquot of acid solution 54 has a liquid to solid ratio of approximately 10:1 milliliters per gram (mL/g). The combined aliquot of acid solution 54 and ash 52 are then agitated 58 overnight or for approximately 18 hours. After agitation 58, the pH of the agitated mixture is measured and recorded 60. The combining 56, agitating 58, and measuring/recording 60 steps are performed on a plurality of samples of ash material using varying quantities of acid to generate a titration curve, an example of which is shown in FIG. 3, plotting final pH of the combined acid solution and ash sample after agitation versus mmol of acid added.

In an embodiment, a titration curve is generated by performing the combining 56, agitating 58, and measuring/recording 60 steps of the titration test 50 using a range of acid additions between approximately 0 mmol acid/gram of ash material and approximately 30 mmol acid/gram of ash material while maintaining a liquid solid ratio of 10:1.

In an embodiment, the acid used to perform the pH titration test 50 described above comprises HCl, $HNO_3$ and combinations thereof. When performing the pH titration test, the same acid in differing amounts is used to generate each aliquot of acid solution 54.

The pH titration test 50 was performed using samples of a fly ash comprising approximately 21 wt % Ca and 5 M HCl to generate the acid solution aliquots. TABLE 1 provides exemplary data on the acid aliquots added to samples of fly ash and the final pH measurement after agitation of the sample and acid solution. The data in TABLE 1 is illustrative and does not correspond to the complete performance of the pH titration test described herein. Data not shown in the End pH column was not collected for the exemplary data table.

TABLE 1

| mL 5M HCl | mL DI water | Acid Amount (mmol) | Acid Added (mmol/g) | Batch Name | End pH |
| --- | --- | --- | --- | --- | --- |
| 0.0 | 5.0 | 0 | 0.0 | Sample 0.0 | |
| 0.4 | 4.6 | 2.0 | 4.0 | Sample 0.4 | 7.2 |
| 0.8 | 4.2 | 4.0 | 8.0 | Sample 0.8 | 4.07 |
| 1.0 | 4.0 | 5.0 | 10.0 | Sample 1.0 | 3.59 |
| 1.2 | 3.8 | 6.0 | 12.0 | Sample 1.2 | 3.38 |
| 1.4 | 3.6 | 7.0 | 14.0 | Sample 1.4 | 3.21 |
| 1.6 | 3.4 | 8.0 | 16.0 | Sample 1.6 | 1.7 |
| 1.8 | 3.2 | 9.0 | 18.0 | Sample 1.8 | |
| 2.0 | 3.0 | 10.0 | 20.0 | Sample 2.0 | |
| 2.2 | 2.8 | 11.0 | 22.0 | Sample 2.2 | 0.22 |
| 2.4 | 2.6 | 12.0 | 24.0 | Sample 2.4 | |
| 3.0 | 2.0 | 15.0 | 30.0 | Sample 3.0 | |

After completing the pH titration test, the pH data collected in step 60 is plotted vs. mmol of acid added to generate a titration curve 70 as shown in FIG. 3.

The pretest protocol 50 is used to generate the titration curve 70 that can be used to limit the amount of acid needed to perform the leaching protocol 10 on a sample of ash material. The amount of acid needed to perform the leaching protocol 10 is limited by looking to the titration curve 70 to predetermine the amount of acid needed to perform each step of the leaching protocol 10.

To predetermine the amount of acid needed to perform the first leaching step 18 of the leaching protocol 10 using a new sample of ash material, the user looks to a titration curve generated according to pretest protocol 50. Looking to the titration curve 70, the amount of acid needed to perform the first leaching step 18 is the acid added corresponding with the end pH (first predetermined pH) of the first leaching step multiplied by the mass of the ash sample to be used in the leaching protocol 10. In FIG. 3, the end pH of the first leaching step 18 corresponds with point A. The amount of acid needed to perform the second leaching step 30 is the acid added corresponding with the end pH (second predetermined pH) of the second leaching step multiplied by the mass of the ash sample to be used in the leaching protocol 10, subtracting the amount of acid used for the first leaching step 18 of the protocol 10. In FIG. 3, the end pH of the second leaching step 30 corresponds with point B. The amount of acid needed to perform the third leaching step 40 is the acid added corresponding with the end pH (third predetermined pH) of the second leaching step 30 multiplied by the mass of the ash sample to be used in the leaching protocol 10, subtracting the amount of acid used for the first and second leaching steps combined. In FIG. 3, the end pH of the third leaching step 40 corresponds with point C.

A schedule of volumetric acid additions and extraction media makeup volumes can be generated per the foregoing for use in the three-step leaching protocol 10 described above. TABLE 2 illustrates an example schedule for acid addition for 100 gram dry ash samples and 1 L leaching solution at L:S ratio of 10:1 mL/g.

TABLE 2

| Step # | End pH | Acid added (mmol/g) | Volume of 5N Acid (mL)* | Volume of DI water makeup (mL) |
|---|---|---|---|---|
| 1 | 5.0 | A | A*20 | 1000-(A*20) |
| 2 | 3.0 | B-A | (B-A)*20 | 1000-(B-A)*20 |
| 3 | 0.0 | C-B | (C-B)*20 | 1000-(C-B)*20 |

*Volume of 5N Acid (mL) = Acid added (mmol/g) * solid dry weight (g)/stock acid concentration (mol/L) = Acid added (mmol/g) * (100 gram)/(5 mol/L) = Acid added * 20 (mL)

In an embodiment, a pH titration pretest is performed because each ash sample has different pH buffering properties depending on the quantity of Ca-rich minerals and metal oxides in ashes.

In yet another embodiment, amounts of acid required for each step of the above-described leaching protocol 10 are predetermined using empirical data collected from multiple ash samples. In this embodiment, a pH titration curve is established with acid additions from 0.0 to 12 mmol/g. Using empirical data, the inventors have discovered suitable estimates for the required amounts of acid addition for the second 30 and third 40 leaching steps of the above-described leaching protocol 10 when the Ca content of the ash material to be leached is 15% or more. In this embodiment, when the Ca content in ash being leached using the above-described protocol 10 is between 15-20%, approximately 18 mmol/g of acid is used in the second leaching step 30. In this embodiment, when the Ca content in the ash material to be leached is 20% or above, approximately 20 mmol/g of acid is used in the second leaching step 30. For either range of Ca content, this embodiment uses approximately 12 mmol/g of acid for the third leaching step 40. TABLE 3 illustrates an example schedule for acid addition for 100 gram dry solid samples ad 1L leaching solution at L:S ratio of 10:1 mL/g for three-step leaching using empirical data method.

TABLE 3

| Step | End pH | Acid added (mmol/g) | Volume of 5N Acid (mL)* | Volume of DI water makeup (mL) |
|---|---|---|---|---|
| First Leach | 5.0 | A | A*20 | 1000-(A*20) |
| Second Leach for ash with 15-20% Ca | 3.0 | 18-A | (18-A)*20 | 1000-(18-A)*20 |
| Second Leach for ash with above 20% Ca | 3.0 | 20-A | (20-A)*20 | 1000-(20-A)*20 |
| Third Leach | 0.0 | 12 | 12*20 | 1000-12*20 |

*Volume of 5N Acid (mL) = Acid added (mmol/g) * solid dry weight (g)/stock acid concentration (mol/L) = Acid added (mmol/g) * (100 gram)/(5 mol/L) = Acid added * 20 (mL)

Ash Detail

The inventors have performed physical characterizations of Physical characterizations using SEM imaging were made of three high-Ca samples with 16 to 21 wt % Ca and one low-Ca ash sample with about 3 wt % Ca as described in Stuckman et al., Characterization and Recover of Rare Earth Elements from Power River basin Coal Ash, 2019 International Pittsburgh Coal Conference, 2019, the entirety of which is incorporated by reference herein. The high-Ca ash samples characterized contain primarily amorphous mineral phases, mainly as Ca or Mg-rich mineral phases (e.g., lime, periclase, anhydrite, merwinite, calcite, and brownmillerite), in contrast to the aluminosilicate phases (e.g., mullite) commonly found in low-Ca ash. Ash particles in high-Ca samples generally display irregular shape with amorphous crust and sometimes crusts are Ca-rich, whereas ash particles in low-Ca samples are tight glassy spheres and not susceptible to direct acid dissolution. Most REEs reside in Ca-crusted aluminiosilicate phases and some REEs are associated with Fe-rich aluminosilicate phases. The solid characterization results show that high-Ca ash samples have particle structure (amorphous crust and irregular shape) susceptible for direct acid dissolution, Ca-rich crust provides morphology for a separate Ca removal step from this type of ash, and the hosting phases for REEs mainly include Al-phases and occasional Fe-phases.

Leaching Example

Batch leaching tests were performed using 10 mL acid solution and 1 gram ash samples combined and agitated by a rotator for 24 hours using three high-Ca ash samples (16 wt % Ca-25 wt % Ca) and one low-Ca ash sample (6 wt % Ca) with different dilute acids (0.1 to 1.7 mol/L of $HNO_3$, HCl, $H_2SO_4$, and citric acid) in duplicates or triplicates. The total number of leaching tests exceeds 200. The leachates were collected by centrifugation and filtration, whose pH, elemental composition and % element extracted were measured and reported in FIGS. 4, 5 and 6. The highest molarity acid used (1.7 mol/L $HNO_3$) contains only 10% volume of solute per volume of solution (v/v) concentrated $HNO_3$.

Figure 4A:
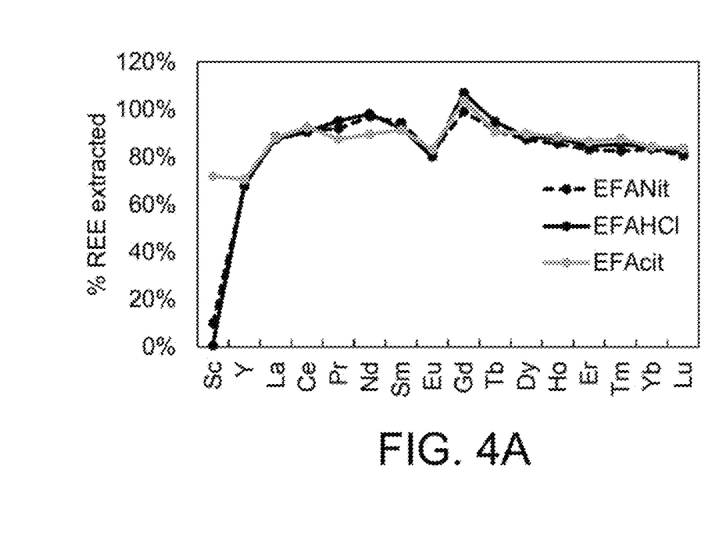
FIGS. 4A and 4B depict the results of leaching tests for one example ash using different acids: 1.7 M $HNO_3$, 1.7 mol/L HCl, and 1.2 mol/L citric acid and the resulting percentage of elements dissolved into the leachate, with FIG. 4A showing percentage of REE leached, and FIG. 4B showing percentage of other elements leached, in accordance with the features of the present invention.
Figure 4B:
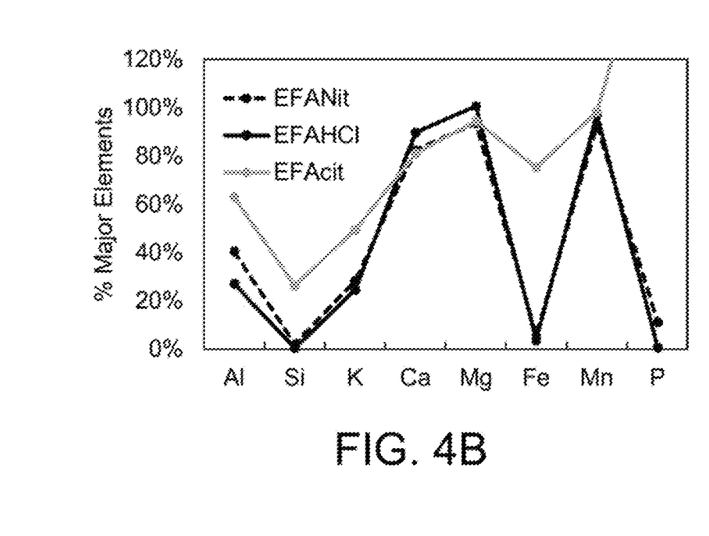

The results of the batch leaching tests (shown in FIGS. 4A and 4B) show that the extractability from HCl and $HNO_3$ leaching are very similar and indicate that the acids can be used interchangeably in the above-described leaching protocol 10. For example, both acids extract greater than 90 percent of REE and release very similar major elements at 1.7 mol/L for a high-Ca fly ash as shown in FIGS. 4A and 48. Citric acid extraction using 1.2 M solution can extract greater than 90 percent of REE and 80 percent of Sc along with additional Al. Si and Fe release as shown in FIGS. 4A and 48. However, high Al and Si content in citric acid resulted in gel formation after around approximately one week when stored at room temperature.

Figure 5A:
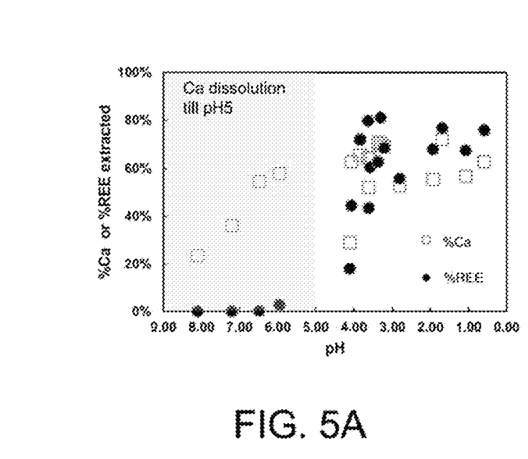
FIGS. 5A-5C are graphs showing percentage of elements extracted from ash vs. end pH, with FIG. 5A depicting the Ca removal in the absence of REE extraction occurred above pH 5, FIG. 5B depicting the simultaneous REE and Al dissolution occurred between pH of 3.0 and 5.0, and FIG. 5C depicting the simultaneous Sc and Fe dissolution occurred between pH of 3.0 and 0, in accordance with the features of the present invention.
Figure 5B:
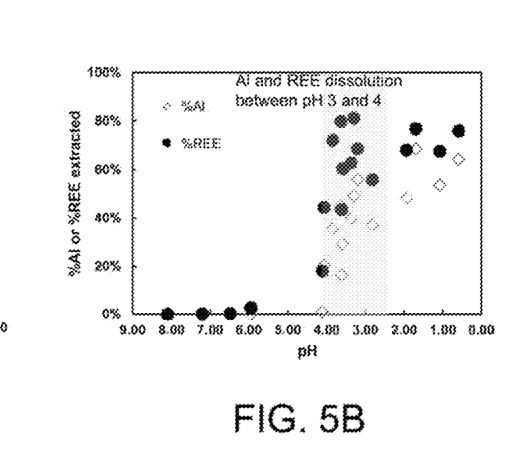
Figure 5C:
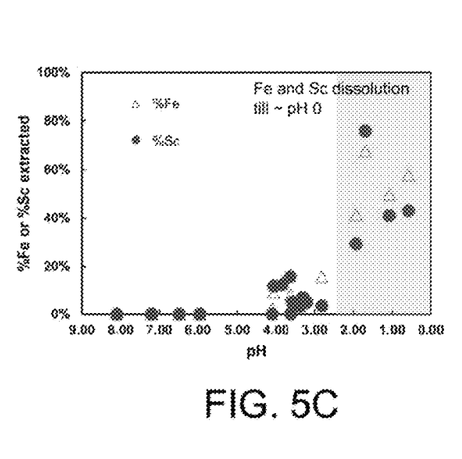

Another batch of acid leaching tests were performed using three different REE-containing ash samples using $HNO_3$ in concentrations between 0.4 and 1.6 mol/L. The leaching results from these tests show that there are different dissolution stages based on end pH ranges. pH measurements described throughout this specification were measured by pH meter. The amounts of each element extracted and the associated end pHs are summarized in FIGS. 5A-5C. Three dissolution stages were observed in reviewing the data generated from these leaching tests: a first dissolution stage where the leachate removes Ca from the ash material at pH 5.0 as shown in FIG. 5A, a second dissolution stage where the leachate removes REEs and Al from the ash material at pH 3.0 as shown in FIG. 5B, and a third dissolution stage where the leachate removes Sc and Fe from the ash material at pH 0.0 as shown in FIG. 5C.

Figure 6A:
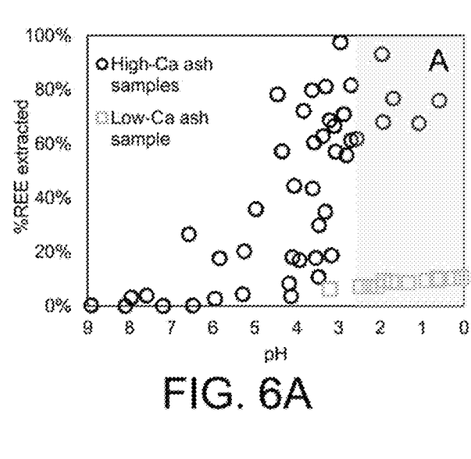
FIGS. 6A-C are graphs giving pH titration data on what elements dissolved into leachates of three high-Ca (between approximately 16 wt % Ca and approximately 21 wt % Ca) ash samples and one low-Ca ash (approximately 6 wt % Ca) sample, with FIG. 6A showing percentage of REEs in leachate versus the end pH, with FIG. 6B showing percentage of REEs in leachate versus the percentage of Al in leachate generated from $HNO_3$ leaching of three high-Ca ash samples, and FIG. 6C Panel C showing the percent of Sc in leachate versus the percentage of Fe in leachate generated from $HNO_3$ leachings of three high-Ca ash samples, in accordance with the features of the present invention.
Figure 6B:
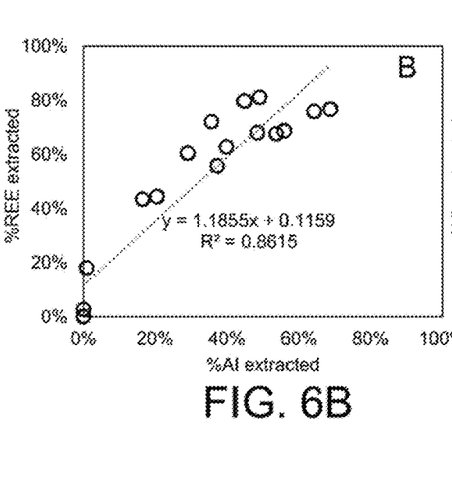
Figure 6C:
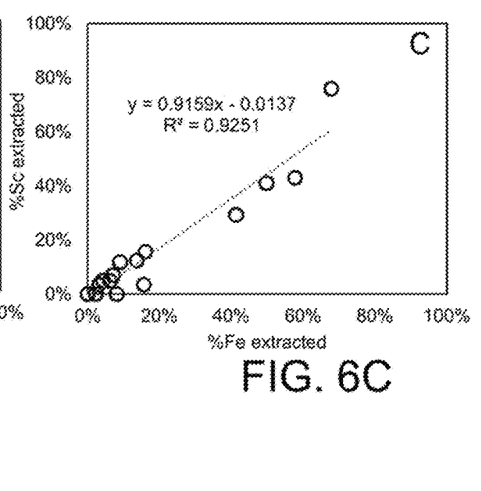

The extractability of REEs from ash material can be impacted by the Ca content of the ash (FIG. 6A). Ash samples with greater than 15 wt % Ca have been confirmed to have high REE extractability using the proposed REE extraction method 10 to take the first leachate to an end pH of 3.0. Summary results from nitric acid leaching showed a high linear correlation between percentage REE and percentage Al extracted (FIG. 6B), and a high linear correlation between percentage of Sc and percentage of Fe extracted (FIG. 6C). These linear correlations confirm different REE hosting phases targeted in the disclosed step-leaching method.

REE Extraction Example 1

The above-described leaching protocol 10 generates a second leachate 32 suitable for extraction of REEs using solvent extraction or oxalic acid precipitation. Solvent extraction and oxalic precipitation methods for REE laden solutions are known in the art. See Xie, F., et al. (2014). "A critical review on solvent extraction of rare earths from aqueous solutions." Minerals Engineering 56: 10-28, the entirety of which is incorporated by reference herein.

The REE extractability of a second leachate 32 produced using the above-described protocol was tested starting with 300 g of ash material having 16 wt % Ca, and using 12.5 mmol/g of HCl (1.25 mol/L HCl at L:S ratio of 10:1 mL/g) to produce a first leachate at end pH of 5.0 and 7.5 mmol/g of sulfuric acid (0.375 mol/L $H_2SO_4$ at L:S ratio of 10:1 mL/g) to produce a second, REE-laden, leachate at end pH of 3.2.

To begin, 100 mL of second leachate PLS was combined with 100 mL of CYANEX® 572 solvent (available from Solvay, Corp. having its headquarters at Neder-Over-Heembeek, Brussels, Belgium) and the mixture agitated for 20 minutes. The CYANEX® solvent was then separated from the stripped second leachate and combined with a fresh 100 mL of second leachate. After 20 minutes of agitation, the CYANEX® was separated from the stripped second leachate. The same 100 mL CYANEX® solvent was used to strip REEs from 30 different fresh 100 mL batches of second leachate. The final REE concentrated CYANEX® solvent was combined with 100 mL 3M HCl for 20 min to strip dissolved REEs from the CYANEX® solvent into acid phase. The REE-containing acid stripping solution was combined with 18 mL 0.5 mol/L oxalic acid for precipitation at a pH of 1.1 adjusted using concentrated $NH_4OH$ (29.7%, 14.8 mol/L). Resulting REE oxalates were centrifuged and rinsed with DI water twice and then centrifuged for final collection.

Figure 7A:
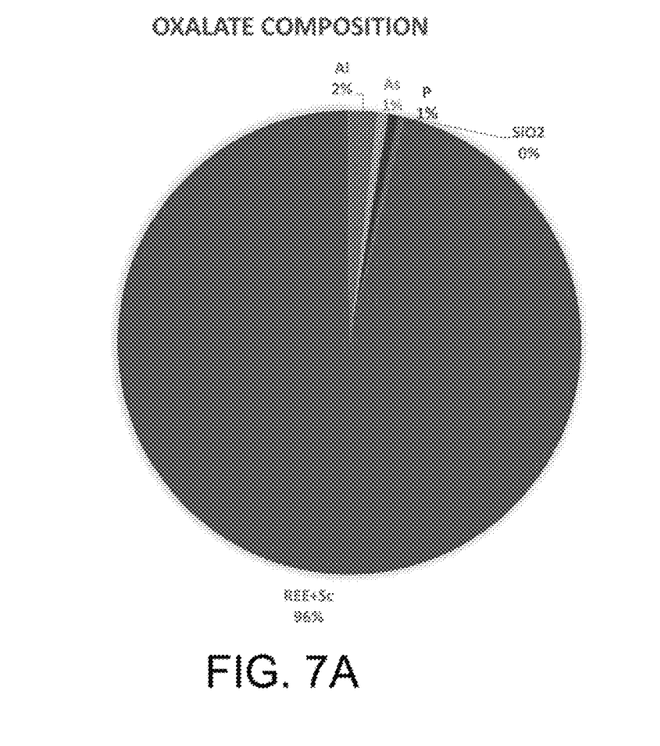
FIGS. 7A-7B are pie graphs showing product distribution after using oxalic acid precipitation to obtain REEs from REE-laden leachate, with FIG. 7A showing the types of oxalates generated, with FIG. 7B showing the distribution of REEs in the REE oxalate precipitates, in accordance with the features of the present invention.
Figure 7B:
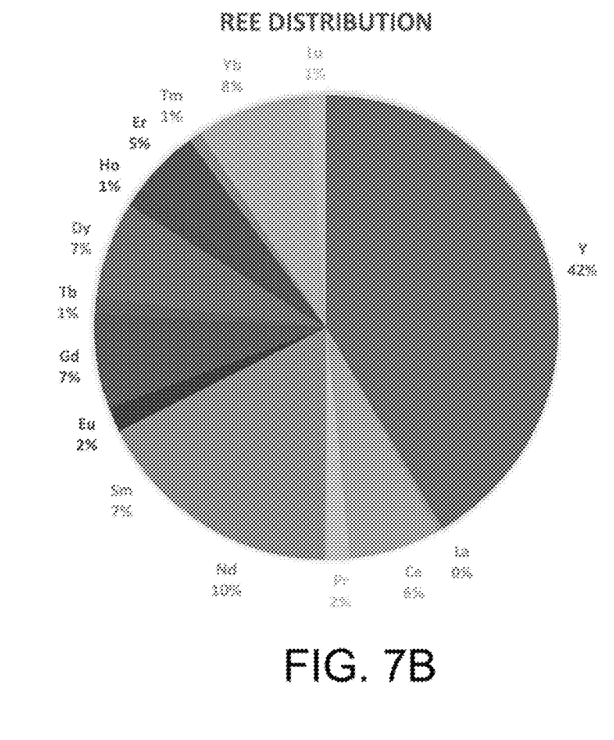

The results showed similar REE extractability using the same extractant (CYANEX®) for 30 different batches of leachate as if fresh extractant was used for each leachate extracted. This indicates that the second leachate from the above-described leaching protocol 10 will consume much less solvent (total leachate:solvent ratio of 30:1), compared to current industrial process (second leachate:solvent ratio of 1:1-10). The end product was generated as 96% wt rare earth oxalates containing 57% critical REEs (e.g., Y, Nd, Pr, Eu, and Dy). FIGS. 7A and 7B provide the types of oxalates obtained from this example as well as the REE distribution present in the oxalates.

Empirical testing determined that approximately 80% of the REEs were extracted from the ash material in this example using the invented protocol.

Having described the basic concept of the embodiments, it will be apparent to those skilled in the art that the foregoing detailed disclosure is intended to be presented by way of example. Accordingly, these terms should be interpreted as indicating that insubstantial or inconsequential modifications or alterations and various improvements of the subject matter described and claimed are considered to be within the scope of the spirited embodiments as recited in the appended claims. Additionally, the recited order of the elements or sequences, or the use of numbers, letters or other designations therefor, is not intended to limit the claimed processes to any order except as may be specified. All ranges disclosed herein also encompass any and all possible sub-ranges and combinations of sub-ranges thereof. Any listed range is easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as up to, at least, greater than, less than, and the like refer to ranges which are subsequently broken down into sub-ranges as discussed above. As utilized herein, the terms "about," "substantially," and other similar terms are intended to have a broad meaning in conjunction with the common and accepted usage by those having ordinary skill in the art to which the subject matter of this disclosure pertains. As utilized herein, the term "approximately equal to" shall carry the meaning of being within 15, 10, 5, 4, 3, 2, or 1 percent of the subject measurement, item, unit, or concentration, with preference given to the percent variance. It should be understood by those of skill in the art who review this disclosure that these terms are intended to allow a description of certain features described and claimed without restricting the scope of these features to the exact numerical ranges provided. Accordingly, the embodiments are limited only by the following claims and equivalents thereto. All publications and patent documents cited in this application are incorporated by reference in their entirety for all purposes to the same extent as if each individual publication or patent document were so individually denoted.

Where pH values are given herein to described one or more leachates, the inventors envision using a liquid to solid ratio of 10:1 (ml of acid solution:gram of ash material) to generate said leachates. A person having ordinary skill in the art will readily discern that the pH values will vary where different liquid to solid ratios are used.

Calcium wt % referred to herein are often measured by purveyors of said ash. However, said calcium wt % can be determined empirically through Inductively coupled plasma-optical emission spectrometry or mass spectrometry. Similarly, the elemental content reported herein and shown in the associated figures was calculated using Inductively coupled plasma-optical emission spectrometry or mass spectrometry.

All numeric values are herein assumed to be modified by the terms "about" and "approximately," whether or not explicitly indicated. The terms "about" and "approximately" generally refers to a range of numbers that one of skill in the art would consider equivalent to the recited value (e.g., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

What is claimed is:

1. A method for leaching REEs from ash material comprising:
    contacting an ash material containing REEs with a first acid solution to generate a first leachate having a pH between approximately 5.0 and approximately 5.5, wherein the first leachate comprises calcium but not REEs;
    contacting the ash material with a second acid solution to generate a second leachate having a second pH between approximately 2.8 and approximately 3.5, wherein the second leachate comprises at least 80% of the REEs originally contained in the ash material; and
    contacting the ash material with a third acid solution to generate a third leachate having a third pH between approximately −0.6 and approximately 0.5.

2. The method of claim 1 wherein the first acid solution comprises a solution containing a predetermined amount of a first acid.

3. The method of claim 2 wherein the second acid solution comprises a solution containing a predetermined amount of a second acid.

4. The method of claim 3 wherein the first and second predetermined amounts of acid are between approximately 18 and approximately 20 mmol of acid per gram of ash material.

5. The method of claim 3 wherein the first and second predetermined amounts of acid are determined by generating a pH titration curve from a sample of the ash material.

6. The method of claim 1 wherein the method extracts at least 80% of REEs from the ash material.

7. The method of claim 1 wherein the method is performed at ambient temperature and pressure.

8. A method for leaching REEs from ash material comprising:
    contacting an ash material containing REEs with a first acid solution to generate a first leachate having a pH between approximately 5.0 and approximately 5.5, wherein the first leachate comprises calcium but not REEs;
    contacting the ash material with a second acid solution to generate a second leachate having a second pH between approximately 2.8 and approximately 3.5, wherein the second leachate comprises at least 80% of the REEs originally contained in the ash material; and
    contacting the ash material with a third acid solution to generate a third leachate having a third pH between approximately −0.6 and approximately 0.5, wherein the third leachate comprises Fe and Sc.

9. The method of claim 8 wherein the first acid solution comprises a solution containing a predetermined amount of a first acid.

10. The method of claim 9 wherein the second acid solution comprises a solution containing a predetermined amount of a second acid.

11. The method of claim 10 wherein the first and second predetermined amounts of acid are between approximately 18 and approximately 20 mmol of acid per gram of ash material.

12. The method of claim 10 wherein the first and second predetermined amounts of acid are determined by generating a pH titration curve from a sample of the ash material.

13. The method of claim 8 wherein the method extracts at least 80% of REEs from the ash material.

14. The method of claim 8 wherein the method is performed at ambient temperature and pressure.

* * * * *